(12) United States Patent
Zuzelo

(10) Patent No.: US 7,516,527 B1
(45) Date of Patent: *Apr. 14, 2009

(54) METHOD OF REPAIRING A WORN SKID PLATE ON A CIRCULAR SAW

(76) Inventor: Edward A. Zuzelo, P.O. Box 450, 100 Barren Hill Rd., Conshohocken, PA (US) 19428

( * ) Notice: Subject to any disclaimer, the term of this patent is extended or adjusted under 35 U.S.C. 154(b) by 642 days.

This patent is subject to a terminal disclaimer.

(21) Appl. No.: 11/188,240

(22) Filed: Jul. 25, 2005

Related U.S. Application Data

(63) Continuation-in-part of application No. 10/779,067, filed on Feb. 17, 2004, now Pat. No. 7,007,686.

(51) Int. Cl.
*B23P 6/00* (2006.01)
*B28D 1/04* (2006.01)

(52) U.S. Cl. ............... 29/402.15; 29/402.14; 29/402.17; 29/402.09; 29/402.01; 125/13.01; 125/12; 125/14; 125/36; 30/338; 30/371; 451/350

(58) Field of Classification Search ............... 29/402.01, 29/402.09, 402.14, 402.15, 402.17; 125/13.01, 125/12, 14, 36; 451/350, 352, 442, 454, 451/457; 30/338, 371, 391
See application file for complete search history.

(56) References Cited

U.S. PATENT DOCUMENTS

| 4,903,680 | A | 2/1990 | Chiuminatta et al. | 125/13 |
|---|---|---|---|---|
| 4,928,662 | A | 5/1990 | Chiuminatta et al. | 125/13.01 |
| 5,086,750 | A | 2/1992 | Chiuminatta et al. | 125/13.01 |
| 5,664,553 | A | 9/1997 | Chiuminatta et al. | 125/13.01 |
| 6,736,126 | B2 * | 5/2004 | Schroer et al. | 125/13.01 |
| 7,007,686 | B1 * | 3/2006 | Zuzelo | 125/13.01 |
| 7,163,010 | B2 * | 1/2007 | Markley et al. | 125/14 |
| 7,258,115 | B2 * | 8/2007 | Markley et al. | 125/13.01 |

\* cited by examiner

*Primary Examiner*—Essama Omgba
(74) *Attorney, Agent, or Firm*—LaMorte & Associates

(57) ABSTRACT

A repair assembly for the skid plate of a circular saw and its associated method of repair. If a circular saw has a skid plate that is worn to a point where it needs replacement, this repair assembly is used to reinforce the worn skid plate so it can again be used. The repair assembly includes a flat plate structure having a sort extension and a long extension protruding from different sides. The long extension and the short extension mount directly onto the worn skid plate. The flat plate structure therefore covers the wear surfaces of the worn skid plate, therein providing new wear surfaces. The repair assembly attached over the worn skid plate so the worn skid plate does not have to be removed.

5 Claims, 2 Drawing Sheets

METHOD OF REPAIRING A WORN SKID PLATE ON A CIRCULAR SAW

RELATED APPLICATIONS

This application is a continuation-in-part of U.S. patent application Ser. No. 10/779,067, filed Feb. 14, 2004, now U.S. Pat. No. 7,007,686 entitled Repair Assembly For A Worn Skid Plate Of A Circular Saw.

BACKGROUND OF THE INVENTION

1. Field of the Invention

In general, the present invention relates to the skid plate component of a circular saw that supports the weight of the circular saw as the circular saw moves across a work piece. More particularly, the present invention relates to repair systems for repairing worn skid plates.

2. Description of the Prior Art

There are many makes and models of portable circular saws. Such saws also have varied uses from cutting lumber to cutting concrete. A feature shared by most portable circular saws, regardless of its use, is the skid plate. All circular saws have a blade that is rotated by the motor of the saw. The blade traditionally extends down through a slot in a skid plate. The skid plate is adjustable so that the distance the blade extends below the skid plate can be adjusted. As the circular saw is placed onto a surface to be cut, the blade cuts into that surface until that surface contacts the bottom of the skid plate. As the circular saw is moved along the surface that is being cut, the skid plate slides along that surface, supporting the weight of the circular saw against that surface and regulating the depth of the cut.

Since the skid plate slides against the surface being cut, the skid plate is a wear surface. Over time, the amount of wear experienced by the skid plate may cause the skid plate to need replacement or repair. The amount of wear experienced by a skid plate depends largely upon the type of surface it is moved across. For example, a thick steel skid plate that moves only against wood may never wear out. However, a skid plate that moves along rough concrete may wear out very quickly.

In certain prior art circular saw designs, the tolerances between the position of the rotating saw blade and the position of the slot in the skid plate are kept very small. Consequently, as the blade is stressed, it may wear against the slot in the skid plate. As a result, the sides of the slot in the skid plate also are wear surfaces that are worn away over time. Prior art circular saws with skid plates that experience such wear, are exemplified by U.S. Pat. No. 4,903,680 to Chiuminatta, entitled Skid Plate For Concrete Saw; U.S. Pat. No. 5,664,553 to Chiuminatta, entitled Spring Loaded Skid Plate For A Concrete Saw; U.S. Pat. No. 4,928,662 to Chiuminatta, entitled Skid Plate For Cutting Unhardened Concrete; and U.S. Pat. No. 5,086,750 to Chiuminatta, entitled Skid Plate For Concrete Saw.

With such prior art circular saws, the problem of skid plate wear is so prevalent that replacement skid plates are sold in kits with replacement blades. As such, each time a saw owner buys a replacement blade, they are buying a replacement skid plate. This, of course, adds significantly to the price of the replacement kit. Furthermore, skid plates rarely have to be replaced every time the blade of the circular saw needs replacement. Rather, a skid plate typically will last several times longer than a blade. Thus, when consumers buy some prior art replacement blades, they are also purchasing replacement skid plates that are not needed.

When a skid plate to a circular saw does wear out and needs replacement, the worn skid plate on the circular saw must be removed and the new skid plate installed. A variety of tools are needed to remove the worn skid plate and install the new one. The replacement procedure also requires a significant amount of time. During this time, the circular saw cannot be used. Consequently, the productivity of both the saw and the worker needed to repair the saw are lost.

A need therefore exists for a repair assembly for a circular saw skid plate that can be quickly and easily attached to a worn skid plate without having to remove the worn skid plate. This enables a worn skid plate to be repaired in less time, with less effort and for less money. This need is met by the present invention as described and claimed below.

SUMMARY OF THE INVENTION

The present invention is a repair assembly for the skid plate of a circular saw and its associated method of repair. If a circular saw has a skid plate that is worn to a point where it needs replacement, the present invention repair assembly is used to reinforce the worn skid plate so it can again be used. The repair assembly includes a flat plate structure having a first end and a second end. A slot is formed in said flat plate structure. A long side extension extends upwardly from the first end of the flat plate structure at an obtuse angle. A short side extension extends upwardly from the second end of the flat plate structure at an obtuse angle.

Mounting elements are provided that protrude from the short side extension. A mechanical fastener is provided for engaging the mounting elements. When the flat plate structure abuts against the skid plate, the mounting elements pass around the skid plate and the mechanical fastener engages the mounting elements behind the skid plate. Consequently, the skid plate is interposed between the mechanical fasteners and the flat plate structure, thereby causing the slot in the flat plate structure to align with the blade slot.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention repair system can be used on many types of skid plates for various makes and models of circular saws, it is particularly well sited for use on circular saws with protruding skid plates. A protruding skid plate is a feature that is prevalent on circular saws that are designed to cut unhardened concrete. As such, the present invention repair assembly will be described in an application where it is being attached to a saw that cuts unhardened concrete in order to set forth the best mode contemplated for the invention. However, such an exemplary embodiment should not be considered a limitation on the application of the present invention repair assembly to other makes and models of circular saws that have skid plates.

Figure 1:
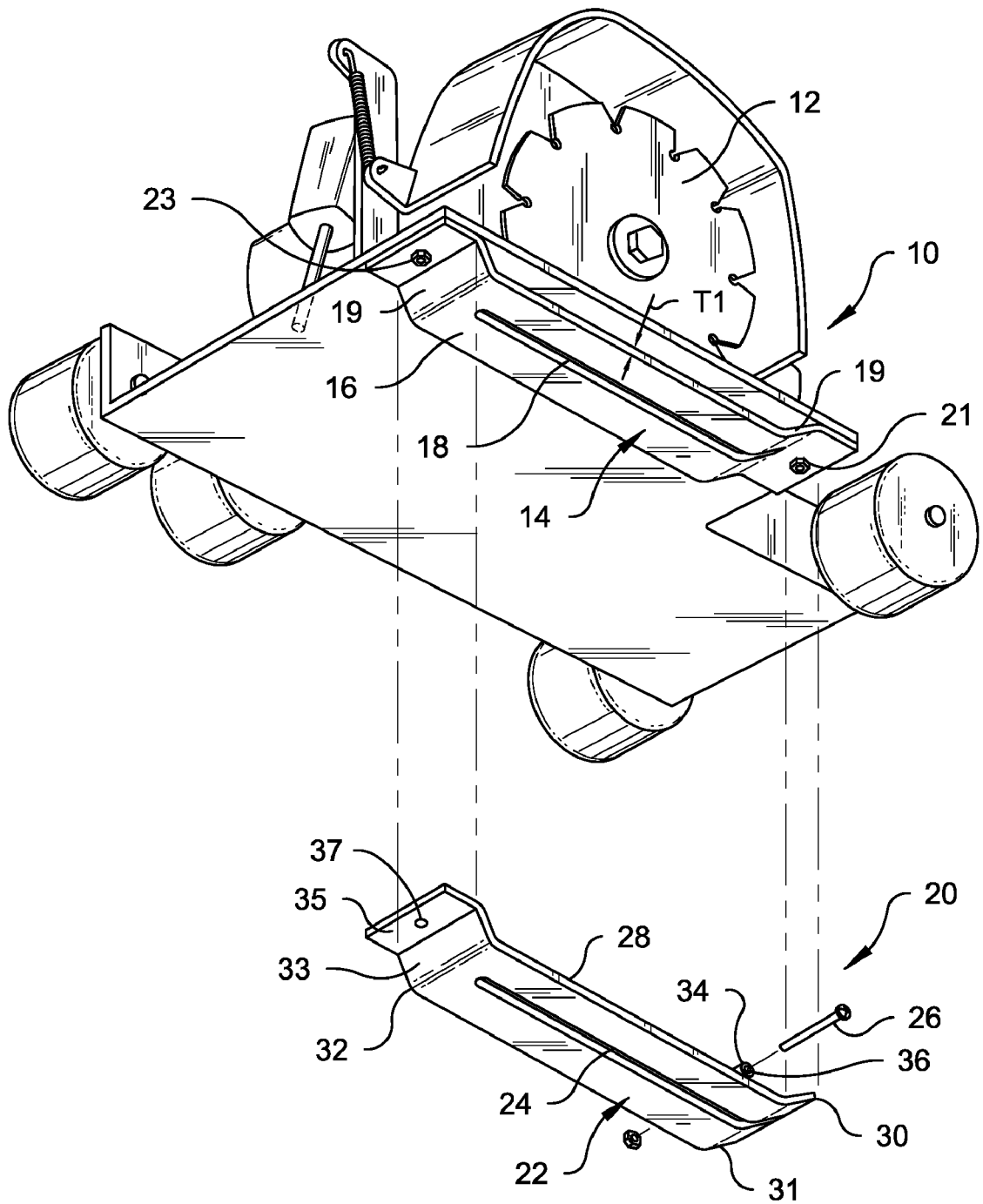
FIG. 1 is a perspective view of an exemplary embodiment of the present invention repair assembly, shown with a prior art circular saw having a protruding skid plate.

Referring to FIG. 1, there is shown an exemplary embodiment of the present invention repair assembly 20 along with a prior art circular saw 10. The circular saw 10 has a rotating blade 12. Positioned below the rotating blade 12 is a protruding skid plate 14. The skid plate 14 has a bottom surface 16 that actually moves against the surface being cut. A blade slot 18 is formed in the bottom surface 16 of the skid plate 14 that enables the rotating blade 12 to extend through the skid plate 14 and cut the underlying surface. The bottom surface 16 of the skid plate 14 is supported by arm elements 19 that extend from the ends of the bottom surface 16. The arm elements 19 extend to the main body of the circular saw 10, where they are bolted in fixed positions. In the shown embodiment, the skid plate 14 is bolted to the circular saw 10 by a single front bolt 21 and a single rear bolt 23.

The bottom surface 16 of the skid plate 14 and its supporting arm elements 19 have the same width W1. The bottom surface 16 of the skid plate 14 is also manufactured with an initial thickness T1. Furthermore, the blade slot 18 is manufactured with certain initial dimensions. As the circular saw 10 is used, the thickness T1 of the bottom surface 16 of the skid plate 14 decreases. Furthermore, the size of the slot 18 increases as the sides of the slot 18 wear. Eventually, the skid plate 14 needs to be repaired before the circular saw 10 can continue to function properly.

The present invention repair assembly 20 contains a secondary plate structure 22 that attaches to the bottom surface 16 of the worn skid plate 14. The secondary plate structure 22 provides a new wear surface over the worn skid plate 14. The secondary plate structure 22 defines a new slot 24 of proper dimensions. Thus, by attaching the secondary plate structure 22 over the existing skid plate 14, the worn surfaces of the skid plate 14 are brought back into specifications and the circular saw 10 can be again used properly.

Figure 2:
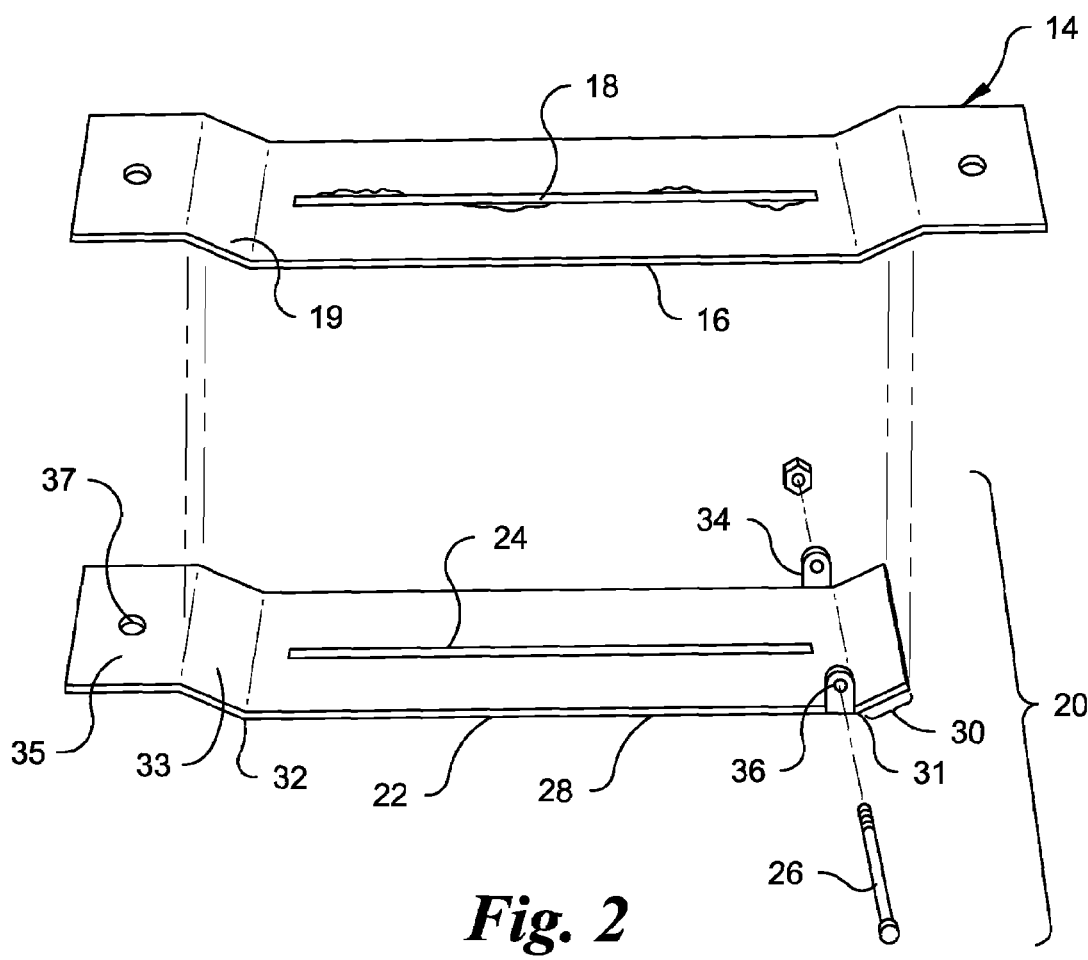
FIG. 2 is a perspective view of the embodiment of the present invention shown in FIG. 1, shown in conjunction with just the skid plate of a prior art circular saw.

Referring to FIG. 2 in conjunction with FIG. 1, it can be seen that the repair assembly 20 includes the secondary plate structure 22 and a fastener 26 needed to mount part of the secondary plate structure 22 in place. The secondary plate structure 22 has a flat base 28. The flat base 28 is the same length as the bottom surface 16 of the skid plate 14 and is at least as wide as the bottom surface 16 of the skid plate 14. A slot 24 is formed through the flat base 28 of the secondary plate structure 22. The slot 24 has a width that matches the original, unworn width of the blade slot 18 in the skid plate 14. The length of the slot 24 is at least as long as the original, unworn length of the blade slot 18 in the skid plate 14.

The flat base 28 of the secondary plate structure 22 has a first front end 31 and a second rear end 32. A short side extension 30 extends from the front end at an obtuse angle. Similarly a long side extension 33 extends from the rear end 32 of the flat base 28 at an obtuse angle. The angles at which the short side extension 30 and the long side extension 33 protrude match the angles of the arm elements 19 on the skid plate 14 of the circular saw. Accordingly, when the secondary plate structure 22 is placed over the worn skid plate 14, the flat base 28 lay flush against the bottom surface 16 of the skid plate 14 and both the short side extension 30 and the long side extension 33 lays flush against the arm elements 19 of the skid plate 14.

The short side extension 30 of the secondary plate structure 22 is not as long as either of the arm elements 19 on the worn skid plate 14. As such, the short side extension 30 terminates along the length of an arm element 19 as the short side extension 30 lays against that arm element 19.

Mounts 34 extend inwardly from opposite sides of each of the short side extension 30. Each mount 34 defines a hole 36. The holes 36 of the mounts 34 on opposite sides of the short side extension are aligned.

A mechanical fastener 26 is provided that extends through the holes 36 in the mounts 34. In the shown embodiment, the mechanical fastener 26 is a bolt with attaching nut. However, it should be understood that locking pins, screws, clips and other such mechanical fasteners can also be used.

The long side extension 33 of the secondary plate structure 22 is just as long as either of the arm elements 19 on the worn skid plate 14. As such, the long side extension 33 extends along the length of the rearward arm element 19.

A mounting lip 35 is joined to the end of the long side extension 33. The mounting lip is flat and is parallel to the bottom surface 16 of the skid plate 14. A mounting hole 37 is formed through the mounting lip 35. The mounting hole 37 aligns with the rear mounting bolt 23 of the worn skid plate 14. Thus, the nut on the rear mounting bolt 23 that holds the worn skid plate in place can be removed and the mounting lip 35 set into place over the rear mounting bolt 23 before the nut is replaced.

Figure 3:
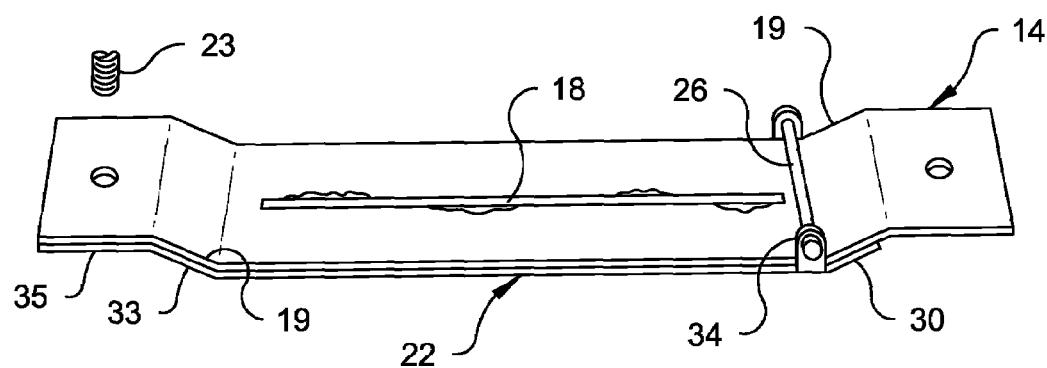
FIG. 3 shows the elements of FIG. 2 assembled together.

Referring now to FIG. 3, it will be understood that to connect the secondary plate structure 22 to the worn skid plate 14, the secondary plate structure 22 is placed over the worn skid plate 14 so that the blade slot 18 on the skid plate 14 and the slot 24 in the secondary plate structure 22 align. When the secondary plate structure 22 is in this position, the long side extension 33 lays flush against one of the arm elements 19 of the skid plate 14. The mounting lip 35 is anchored in place using the rear mounting bolt 23 which is already present on the circular saw.

The short side extension 30 attaches to the worn skid plate 14 is a different manner. The mounts 34 on the short side extension 30 extend over the sides of the worn skid plate 14. The mechanical fastener 26 is then advanced through the mounts 34, thereby locking the short side extension 30 in position.

The circular saw can then be used in its normal operating manner until the secondary plate structure wears out. Once this happens, the secondary plate structure can be removed and another can be installed in its place.

The present invention repair assembly provides new surfaces to the surfaces of the original skid plate that are worn. These new surfaces, in the form of the secondary plate structure, can be quickly and easily installed without having to disassemble the circular saw. Consequently, the amount of time needed to fix a worn skid plate is greatly reduced. Furthermore, since the secondary plate structure is smaller and less complex than a full skid plate, it is easier and cheaper to manufacture. Thus, a worn skid plate can be fixed less expensively.

It will be understood that the embodiment of the present invention repair assembly shown and illustrated are merely exemplary and that a person skilled in the art can make many variations to the designs shown. The shape of the secondary plate structure used in the repair assembly mimics the shape of the original skid plate. Since skid plates of different sizes and configurations exist, it will be understood that the secondary plate structure can also be formed in different sizes and configurations that complement the skid plate being repaired.

Furthermore, in the shown embodiment of the present invention, different mounting systems are used to secure the secondary plate structure to the worn skid plate. It will be understood that other attachment means that are not shown, such as clamps and snap-on features, can also be adapted for use on the present invention.

All such alternate embodiments and modifications are intended to be included in the present invention repair assembly as described and claimed below.

What is claimed is:

1. A method of repairing a worn skid plate on a circular saw, said method comprising the steps of:
   providing a secondary plate structure having a flat base and mounting elements that protrude from said secondary plate structure;
   providing a plurality of mechanical fasteners;
   positioning said secondary plate structure over the worn skid plate to reinforce the worn skid plate, wherein said flat base abuts against said worn skid plate, and said mounting elements protrude around said worn skid plate; and
   engaging each of said mounting elements with one of said plurality of mechanical fasteners behind said worn skid plate so that said worn skid plate is interposed between said mechanical fasteners and said secondary plate structure.

2. The method according to claim 1, wherein the worn skid plate has a blade slot and said secondary plate structure defines a slot, wherein said step of attaching said secondary plate structure over the worn skid plate includes aligning said slot in said secondary plate structure with said blade slot.

3. The method according to claim 1, wherein the worn skid plate has a contoured shape and said step of providing a secondary plate structure includes providing a secondary plate structure of a contoured shape so that said secondary plate structure abuts against the worn skid plate along its length.

4. A method of repairing a worn skid plate on a circular saw, said method comprising the steps of:
   providing a secondary plate structure having a flat plate structure, a long side extension extending from a first end of said flat plate structure, a short side extension extending from a second end of said flat plate structure, mounting elements protruding from said short side extension, and a bolt hole disposed in said long side extension;
   positioning said secondary plate structure over the worn skid plate to reinforce the worn skid plate;
   bolting said long side extension to said worn skid plate through said bolt hole;
   providing at least one mechanical fastener; and
   attaching said at least one mechanical fastener to said mounting elements behind said worn skid plate so that said worn skid plate is interposed between said at least one mechanical fastener and said secondary plate structure.

5. The method according to claim 4, wherein the worn skid plate has a blade slot and said secondary plate structure defines a slot, wherein said step of positioning said secondary plate structure over the worn skid plate includes aligning said slot in said secondary plate structure with said blade slot.

* * * * *